June 24, 1958   L. W. SCHOPPEE   2,840,223
ARTICLE FEEDING MEANS
Filed Jan. 7, 1957   3 Sheets-Sheet 3

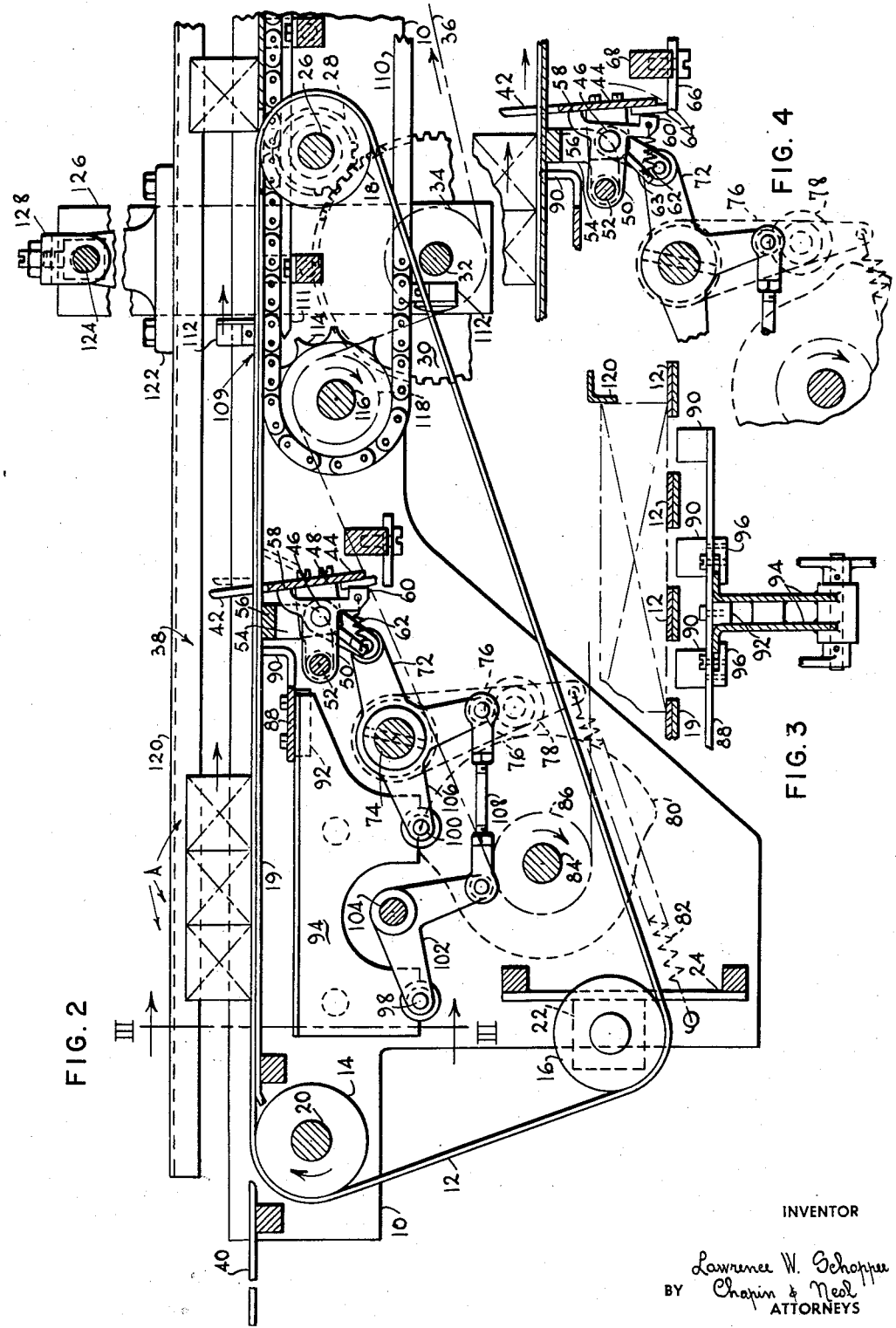

INVENTOR
Lawrence W. Schoppee
BY Chapin & Neal
ATTORNEYS

# United States Patent Office 2,840,223
Patented June 24, 1958

2,840,223

ARTICLE FEEDING MEANS

Lawrence W. Schoppee, Springfield, Mass., assignor to Package Machinery Company, East Longmeadow, Mass., a corporation of Massachusetts Application January 7, 1957, Serial No. 632,734

14 Claims. (Cl. 198—34)

The present invention relates to packaging machines and more particularly to devices for feeding articles to packaging machines in spaced apart relationship.

In many packaging operations it is either desirable or essential that articles be handled individually, and a great number of packaging machines are designed to receive articles in spaced apart relation in order to facilitate the carrying out of their operations. This spaced apart relation of the articles can, of course, be provided by manually positioning each article presented to a given machine, however, any operation requiring individual article positioning manually is inefficient and time consuming. Greater speed can be obtained by an operator servicing more than one machine and presenting several articles at a time to each machine, in which case they will usually be closely packed together and/or irregularly spaced. Moreover when successive operations are performed on the article the trend is more and more to eliminate the need for a plurality of operators by placing such machines in series and automatically presenting articles to each successive machine. Here again, the spacing between articles often will be indiscriminate with many articles abutting each other. In either case the problem arises as to how to separate closely packed articles so that they may be presented to a work treating machine in spaced apart relationship.

My invention has for its object the provision of a feed device which can be either manually or automatically supplied with indiscriminately spaced articles and then present such articles to a work treating machine in the desired spaced relation.

My invention in one aspect comprises a moving belt on which articles are placed and a stop in obstructive relation with the articles so placed to register articles thereon. A separator below the belt is lifted to raise the trailing edge of the foremost article registered, thus bringing the separator into the path of travel of the remaining articles. Thereafter, the stop is moved out of its obstructive relation allowing the foremost article to be carried away by the belt. After the foremost article has passed beyond it the stop is brought again into obstructive relation and the separator is then lowered beneath the belt. These motions of the stop and separator may be repeated as desired to release successive articles from the supply in spaced apart relation.

Another aspect of my invention will be found in controlling the releasing motions of the stop and separator in timed relation to the operation of an associated work treating machine and a conveyor having spaced pushers for presenting articles thereto.

Yet another aspect of my invention is found in the combination of a separator and stop operating in the manner described above in timed relationship to the operation of an associated work treating machine wherein means are provided for preventing such movements unless at least one article on the moving belt is properly registered for release to the associated machine and in proper timed relationship to its operation.

The above and other related objects and aspects of my invention will be more fully understood from a reading of the following detailed description of a preferred embodiment thereof, making reference to the accompanying drawings, and the particular novelty thereof pointed out in the appended claims.

In the drawings,

Fig. 2 is a section taken along the line II—II in Fig. 1;

Fig. 3 is a section taken on the line III—III in Fig. 2;

Figure 8:
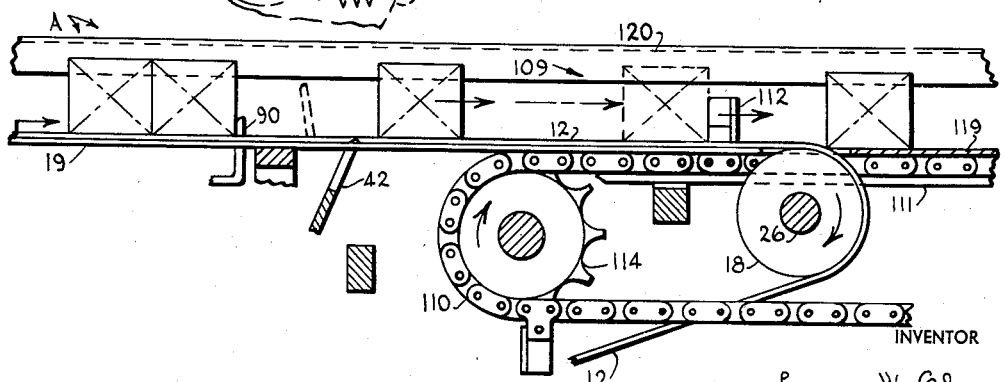

Figs. 4, 5, 6, and 7 are views of a separating mechanism seen in Fig. 2, illustrating different operating positions thereof; and Fig. 8 is a view of a conveyor mechanism seen in Fig. 2, illustrating its relationship to the separated article.

The feed device illustrated comprises two spaced apart main frame members 10 which may be supported on legs extending from the floor or by the machine or machines with which the device is associated. A series of belts 12 are spaced apart across the width of the device, running around idler pulleys 14 and 16 and are driven by powered pulleys 18. In order that the belts 12 may carry a substantial load without any undue sagging separate back-up plates 19 are mounted on transverse frame members and spaced immediately beneath the upper run of each belt 12.

The pulleys 14 are rotatably mounted on a shaft 20 (Fig. 2) extending between and secured at its ends to the side frames 10, while the pulleys 16 are journaled on individual pillow blocks 22 which may be adjusted up and down on plates 24 to provide proper tensioning of each belt 12. The powered pulleys 18 are each secured to a shaft 26 extending between the frames 10 and journaled thereon. One end of the shaft 26 carries a gear 28 which meshes with a second gear 30 which is secured to a shaft 32 also extending between the frames 10 and journaled thereon. Integral with and outwardly of the gear 30 is a sprocket 34 which is rotated by a roller chain 36 extending from the work treating machine with which the present device is associated and driven by a timed shaft of that machine.

The roller chain 36 is constantly moving in the direction indicated by the arrow in Fig. 2 so that the belts 12 will carry articles A placed thereon from the infeed side of the machine (at the left in Fig. 2) towards stop means indicated generally by the reference character 38. The articles on the conveyor belt 12 may be placed directly thereon by an operator, or may be slid along an auxiliary table 40 by automatic means, not shown.

In any event, the articles will be carried toward the stop means 38 until they contact stop fingers 42 which extend between and above the belts 12 from a transversely disposed plate 44. The plate 44 is pivotally connected to a bar 46 by lugs 48. A second pivotal mounting means comprising arms 50 carries the bar 46, the arms 50 being pivotally mounted about a second bar 52 which is held at its ends by off-set lugs 54 which are secured to a transverse frame member 56. The arms 50 are provided with upper abutments 58 and lower abutments 60 adjacent the plate 44 and above and below the pivotal connection provided by the bar 46. A spring 62 extending between one abutment 60 and a pin 63 inserted in one of the lugs 48 normally maintains the plate 44 in engagement with the upper abutments 58. The lower end of the plate and particularly a wear piece 64 are spaced immediately above a latch plate 66 secured to a transversely extending frame member 58. With this arrangement the stop fingers 42 may not be moved beneath the surface of the belts 12 unless the spring 62 is overcome by the pressure of an article being fed thereagainst, as is illustrated in Figs. 2 and 4.

When the plate 44 is rotated about bar 46 to the dashed position indicated in Fig. 2, the mechanism now to be described, periodically lowers the stop fingers 42 beneath the surface of the belts 12. An arm 70 extending from the shaft 46 is connected to a lever 72 which is fastened to a rock shaft 74 extending between the frames 10 and journaled thereon. On an end of the rock shaft, exteriorly of one frame 10, there is secured a follower arm 76 with follower roll 78 which is urged into engagement with a cam 80 by a spring 82. The cam 80 is secured to a further transversely extending shaft 84 and has integrally formed therewith a sprocket 86 around which the roller chain 36 also passes to provide for its rotation. It will thus be seen, that upon rotation of the cam 80 the fingers 42 can be moved from a position above the belts 12 to a position below these belts provided the spring 62 is overpowered to permit the wear plate 64 to pass beyond the latch plate 66.

Figure 5:
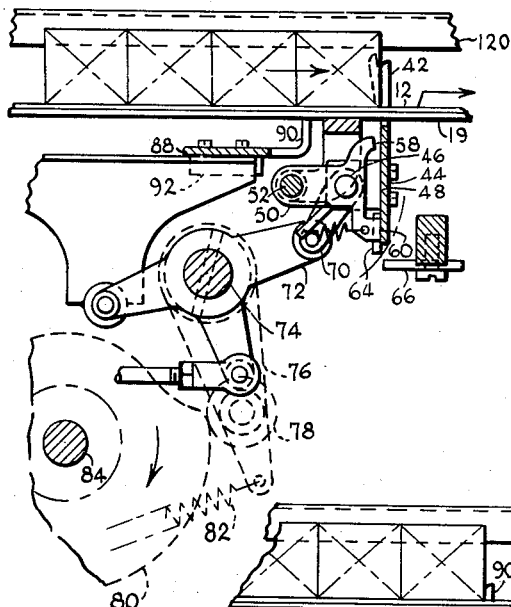
Figure 6:
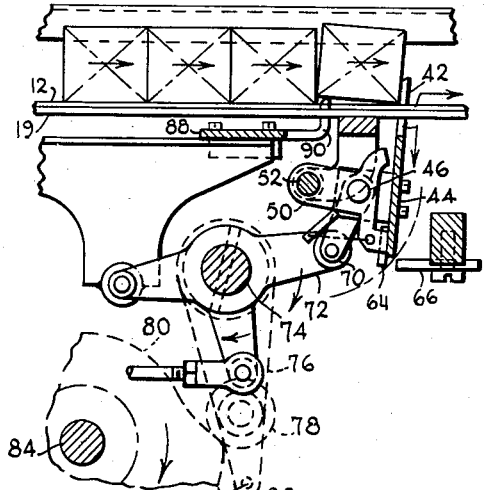
Figure 7:
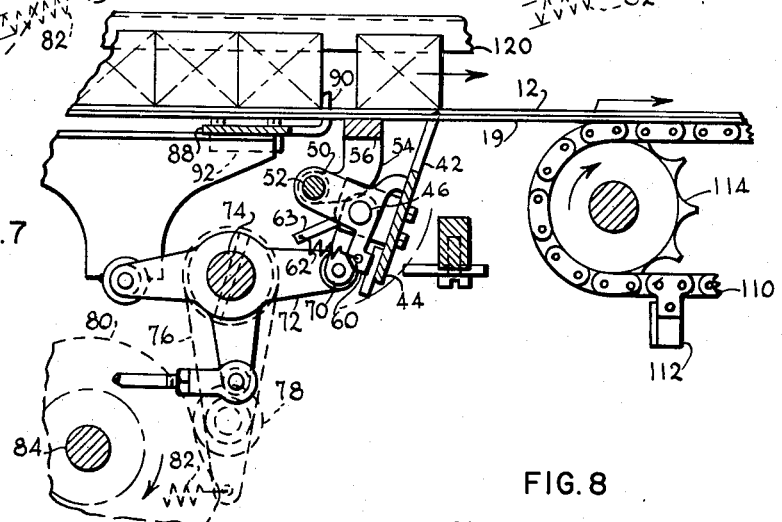

A separator plate 88 is disposed on the infeed side of the stop fingers 42 and has upturned separator fingers 90 spaced between and below the belts 12. The fingers 90 are spaced from the stop fingers 42 so that they are immediately beneath the trailing edge of the foremost article on the belts 12, as is illustrated in Fig. 5.

The plate 88 has attached thereto a centrally disposed guide 92 which extends between vertical plates 94 with the separator plate resting on outward flanges of the plates 94. Clamps 96 are provided to secure the plate 88 in any desired longitudinal position on the vertical plates 94. It will be apparent that this arrangement permits the fingers 90 to be spaced from the stop fingers 42 so as to engage the trailing edge portion of the particular size articles being handled by my device.

The plates 94 are provided with two pivotal mountings 98, 100 at their lower ends, a bell crank 102 is connected at one end to either side of the pivotal mounting 98 and rotates about a transverse shaft 104. A second bell crank 106 is connected at one end to the pivotal mounting 100 and is secured to the rock shaft 74. It will be noted that for convenience of manufacture the bell crank 106 is formed integrally with the lever 72. The bell cranks 102 and 106 have identical center distances and angular relationships, their lower ends being interconnected by a link 108 the length of which is equal to the distance between the shafts 104 and 74. With this arrangement rotative or oscillative movement of the rock shaft 74 will raise the plates 94 and the separator fingers 90 in a substantially rectilinear manner. Thus, regardless of the longitudinal adjustment of the fingers 90 they will each time be raised substantially the same distance above the belts 12.

Figure 1:
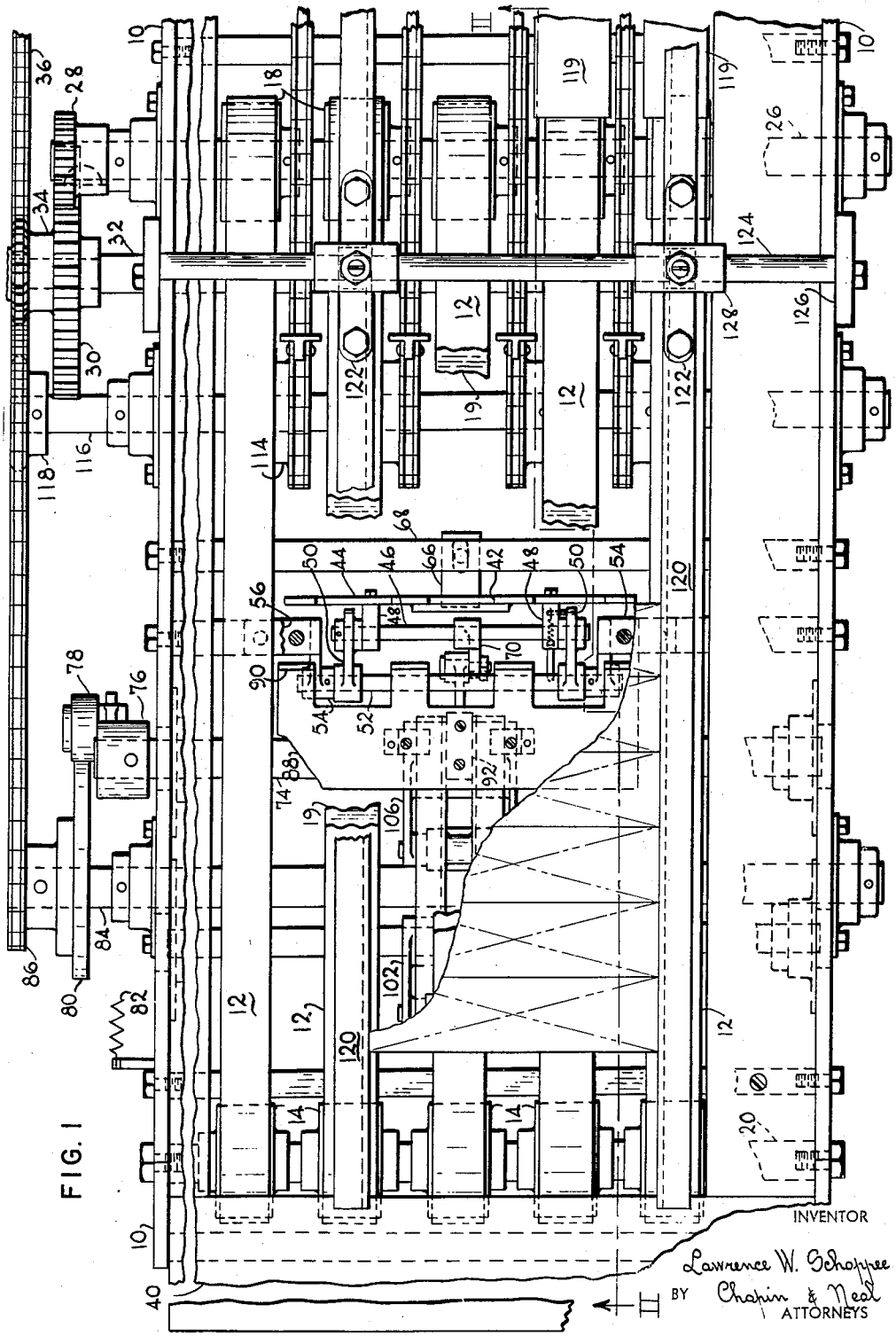
Fig. 1 is a plan view of my novel feeding device.

There is also provided a conveyor 109 comprising roller chains 110 spaced across the width of the device and having spaced pushers 112. It will be seen from Figs. 1 and 2 that portions of the belts 12 and the conveyor 109 are coextensive with the upper runs of the conveyor riding on rails 111. The conveyor chain belts 110 are driven by sprockets 114 secured to a transverse shaft 116, which is driven through a sprocket 118 by the roller chain 36 from the associated work treating machine. The other ends of the chains 112 pass around sprockets, not shown, which are mounted on or adjacent to the associated work treating machine to which articles are to be presented by the pushers 112. Beyond the belts 12, plates 119 are provided to support articles being carried along by the pushers (certain of these plates have been omitted from Fig. 1 for clarity).

If desired, longitudinally extending rails 120 may be provided to transversely position the articles being handled by the feed device. The rails 120 may be secured to T-shaped brackets 122 carried at their upper ends on a transversely extending rod 124 which is fastened to uprights 126. A U-shaped clamp 128 is associated with each bracket 122 to secure the side rails 120 in their desired transverse positions. It may be found desirable to support the ends of the side rails adjacent the work treating machine by similar adjustable means.

Articles placed either manually or in some automatic fashion on the belts 12 are carried from the infeed side of the device toward the stop means 38 either in indiscriminately spaced relation or closely packed together as illustrated in Fig. 2. Upon contact of at least one article with the stop fingers 42 its feeding pressure as exerted by the belts 12 overcomes the spring 62 rotating the plate 44 into engagement with the lower abutments 60 pushing the wear plate 64 clear of the latch plate 66 (Fig. 5).

When the cam 80 is rotated to bring its depression to the follower roll 78 the rock shaft 74 is oscillated to move the lever 72 downwardly and thus rotate the stop plate 44 downwardly to bring the stop fingers 42 beneath the belts 12. However, before the fingers 42 pass beneath the belts 12 the same oscillating movement of the rock shaft 74 rotates the bell crank 106 and thus also the bell crank 102 to raise the separator fingers 90 and lift the trailing edge of the foremost article registered by engagement with the stop fingers 42. This movement of the separator fingers 90 disassociates the foremost article from the successive articles and also provides a barrier preventing the successive articles from being carried therebeyond by the moving belts 12. While the upward movement of the separator fingers 90 and the lowering movement of the stop fingers 42 occurs simultaneously it will be noted that the stop fingers 42 do not pass beneath the belts 12 until after the separator fingers 90 have provided a barrier preventing any substantial movement of the successive articles. In this manner the final downward movement of the stop fingers 42 releases the foremost article and allows it to be carried by the belts 12 toward the conveyor 109. The rotative movement of the cam 80 which causes the article to be released is so timed with relation to the movement of the conveyor 109 that the released article will always be captured between a pair of the spaced pushers 112. It will be noted at this point that the belts 12 are driven at a greater linear speed than the pushers 112 so that often times the released article will overtake and bear against the foremost of the pushers 112 between which it is captured. However, after the article passes beyond the belts 112 it will rest on the plates 119 until the rearmost pusher arrives to carry it to the associated work treating machine. This arrangement is found preferable in simplifying or eliminating any problems which might exist in the timed relationship between the motions of the separator fingers 90 and stop fingers 42 and the pushers 112.

After the foremost article has been released continued rotative movement of the cam 80 brings its rise into contact with the follower 78 to oscillate the rock shaft 74 in the opposite direction. Thus the stop fingers 42 are returned to their obstructive relation above the belts 12 as the separator fingers 90 are lowered therebeneath. In this connection it will be noted that the fingers 42 are raised above the belts 20 to provide stop means prior to the complete lowering of the fingers 90 beneath the belts 12 to allow the next successive article to be carried therebeyond by the belts 12.

The above motions of the stop fingers 42 and separator fingers 90 are repeated once for each revolution of the cam 80, thereby releasing articles for deliverance to the associated work treating machine in proper timed relationship for presentation thereto, as facilitated by the spaced pushers 112. However, if an article should fail to be in engagement with the stop fingers 42 the spring 62 will bring the wear plate 64 into obstructive relation with the latch plate 66. Thus when the depression in the cam 80 reaches the follower roll 78 the spring 82 will tend to urge the arm 76 and rock shaft 74 in a direction to lower the stop fingers 42 and raise the separator fingers 90. However, the latch plate 66 will prevent these motions from taking place and allow the articles to be carried toward the stop means by the belts 12. It is important to note that the arrangement of the center of rotation provided by the bar 52 and the pivotal connection between the lever 72 and arm 60 is such that a very strong locking force is provided which will prevent rotative movement of the stop plate 44 about the rod 46 when the wear plate 64 is brought into engagement with the latch plate 66. The fingers 42 thus cannot be lowered to release an article except when the spring 62 has been overcome prior to the depression in the cam 80 reaching the follower roll 78. Therefore, the motions of the stop fingers 42 and 90 always occur at a predetermined time which can be directly related to the movement of the pushers 112 and the cycle of the associated work treating machine, since both are driven by common means, namely the roller chain 36.

While my device has been described in relation to a mode of operation which contemplates the release of one article at a time which will be individually presented to the associated work treating machine a plurality of articles could, if desired, be released where, for example, it was desired to bundle together two articles in a package. One convenient method of delivering two articles at a time would be to double the relative rate of rotation of the cam 80 with respect to the movement of the conveyor 109.

Another method for releasing a plurality of articles would be to position the separator fingers 90 beneath the trailing edge portion of the second or third article (depending on the number to be released) instead of the foremost article. The device could then be run in the same manner as described in detail above though it might be advisable to strengthen the spring 62 (Fig. 4) so that the wear plate 64 will clear the latch plate 66 only if a desired plurality of articles are registered on the belts 12 as reflected by increased pressure on the fingers 42.

Having thus described my invention what I claim as new and novel and desire to secure by Letters Patent of the United States is:

1. An article feeding device which includes a conveyor having a run moving through a fixed plane and on which articles are placed, and article separating means, said conveyor run comprising the sole means for feeding articles to and past said separating means, which means include a stop in obstructive relation with articles on said conveyor run to register such articles on said run, and a separator below said conveyor run and movable thereabove and spaced immediately beneath the trailing edge of the foremost article so registered, means for raising said separator to lift only the said trailing edge and bring the separator into the path of travel of said articles thus providing a barrier for the next successive article, means for thereafter moving said stop out of said obstructive relation allowing the foremost article to be carried away by said conveyor, means for returning said stop into said obstructive relation and means for then lowering said separator below said conveyor run.

2. An article feeding device which includes a conveyor having a run moving through a fixed plane and on which articles are placed, and article separating means, said conveyor comprising the sole means for feeding articles to and past said separating means, which means include a stop in obstructive relation with articles on said conveyor run to register such articles on said run, and a separator below said conveyor run and movable thereabove and spaced immediately beneath the trailing edge of the foremost article so registered, means for raising said separator to lift only the said trailing edge and bring the separator into the path of travel of said articles thus providing a barrier for the next successive article, means for thereafter moving said stop out of said obstructive relation allowing the foremost article to be carried away by said conveyor, means for returning said stop into said obstructive relation, means for then lowering said separator below said conveyor run and means preventing actuation of the means for moving the separator and stop unless an article has been registered by said stop.

3. An article feeding device which includes a first conveyor having a run moving through a fixed plane and on which articles are placed, and article separating means, said first conveyor comprising the sole means for feeding articles to and past said separating means, which means include a stop in obstructive relation with articles on said conveyor run to register such articles on said run, and a separator below said conveyor run and movable thereabove and spaced immediately beneath the trailing edge of the foremost article so registered, a second conveyor having spaced pushers, said first conveyor and said second conveyor having coextensive portions only beyond said stop, means for raising said separator to lift only the said trailing edge and bring the separator into the path of travel of said articles thus providing a barrier for the next successive article, means for thereafter moving said stop out of said obstructive relation in timed relation to the movement of said conveyor pushers thereby allowing the foremost article to be carried away by said first conveyor and captured between said spaced pushers, means for returning said stop into said obstructive relation and means for then lowering said separator below said conveyor run.

4. An article feeding device for presenting articles to a work treating machine one at a time and spaced apart, which device includes a first conveyor having a run moving through a fixed plane and on which articles are placed, and article separating means, said first conveyor comprising the sole means for feeding articles to and past said separating means, which means include a stop in obstructive relation with articles on said conveyor run to register such articles on said run, and a separator below said conveyor run and movable thereabove and spaced immediately beneath the trailing edge of the foremost article so registered, a second conveyor having spaced pushers, said first conveyor and said second conveyor having coextensive portions only beyond said stop, common means extending from the work treating machine for driving said first and second conveyors, means for raising said separator to lift only the said trailing edge and bring the separator into the path of travel of said articles thus providing a barrier for the next successive article, means connecting with said common driving means for thereafter moving said stop out of said obstructive relation in timed relation to movement of said conveyor pushers allowing the foremost article to be carried away by said first conveyor and captured between said spaced pushers, means for returning said stop into said obstructive relation and means connected with said common driving means for then lowering said separator below said conveyor run.

5. An article feed device which includes a conveyor having a run moving through a fixed plane and on which articles are placed, and article separating means, said conveyor comprising the sole means for feeding articles to and past said separating means, which means include a stop in obstructive relation with articles on said conveyor run to register such articles on said run, and a separator below said conveyor run and movable thereabove, said separator being adjustable longitudinally toward and away from said stop so that it may be spaced immediately beneath the trailing edge of the foremost article so registered as the size of articles being fed varies, means for imparting substantially rectilinear upward movement to said separator so that it will lift only the trailing edge of any given article substantially the same distance as well as to bring the separator into the path of travel of said articles thus providing a barrier for the next successive article, means for thereafter moving said stop out of said obstructive relation allowing the foremost article to be carried away by said conveyor, means for returning said stop into said obstructive relation and means for then lowering said separator below said conveyor run.

6. An article feeding device for presenting articles to a work treating machine one at a time and spaced apart, which device includes a first conveyor having a run moving through a fixed plane and on which articles are placed, and article separating means, said first conveyor comprising the sole means for feeding articles to and past said separating means, which means include a stop in obstructive relation with articles on said conveyor run to register such articles on said run, and a separator below said conveyor run and movable thereabove and spaced immediately beneath the trailing edge of the foremost article so registered, a second conveyor having spaced pushers, said first conveyor and said second conveyor having coextensive portions only beyond said stop, common means extending from the work treating machine for driving said first and second conveyors, means for raising said separator to lift only the said trailing edge and bring the separator into the path of travel of said articles thus providing a barrier for the next successive article, means connecting with said common driving means for thereafter moving said stop out of said obstructive relation in timed relation to movement of said conveyor pushers allowing the foremost article to be carried away by said first conveyor and captured between said spaced pushers, means preventing actuation of said separator lifting means and said stop moving means unless an article has been registered by said stop means, means for returning said stop into said obstructive relation after it has been actuated and means connected with said common driving means for then lowering said separator below said conveyor run in proper timed relation.

7. An article feeding device for presenting articles to a work treating machine one at a time and spaced apart, which device includes a main frame, a plurality of belts spaced apart across the width of the device for receiving articles at the infeed side thereof, stop means in obstructive relation with articles on the belt to register such articles on the belts, said stop means comprising a transversely disposed plate having stop fingers extending between and above said belts, pivotal mounting means for said plate offset to the infeed side thereof, a second pivotal mounting means offset further toward the said infeed side and connecting at one end with said frame and at the other end with said first-named pivotal mounting means, said second mounting means having abutments adjacent said stop plate above and below its pivotal mounting means, a latch plate disposed beneath and adjacent the lower edge of the stop plate, spring means for urging said plate into engagement with the upper of said abutments and bringing the lower edge thereof to a position immediately above said latch plate to prevent downward movement below said belts unless said spring means is overcome by the pressure of an article fed against said stop fingers, separator means comprising spaced separator fingers positioned between and below said belts and immediately beneath the trailing edge of the foremost article registered on the belts, a conveyor having spaced pushers, said conveyor and said belt having coextensive portions beyond said stop means, common means extending from the work treating machine for driving said belts and said conveyor, means for raising said separator to lift the said trailing edge and bring the separator fingers into the path of travel of said articles thus providing a barrier for the next successive article, means connecting with said common driving means for thereafter moving said stop fingers out of said obstructive relation in timed relation to the movement of said conveyor pushers provided said spring means has been overcome prior to the actuation of said stop moving means whereby the foremost article in said supply may be carried away by said belts and captured between said spaced pushers, means for returning said stop fingers into said obstructive relation, and means connected with said common driving means for then lowering said separator below said belt.

8. A device as set forth in claim 7 wherein the means for moving the separator and stop means are connected with said common driving means by way of a rotating cam and a spring biased follower and a rock shaft to which said follower is secured.

9. A device as set forth in claim 8 wherein a lever is secured to said rock shaft and an arm is connected thereto and extends from the first-mentioned pivotal mounting means of the stop plate to rotate the stop plate about said second pivotal mounting.

10. A feed device as set forth in claim 7 wherein the separator is mounted in longitudinally adjustable fashion on a vertical member at the lower end of which are provided two longitudinally spaced pivotal mountings, one of said pivotal mountings having a bell crank connected to a transversely extending shaft and the other of said pivotal mountings having a similar bell crank connected to said rock shaft, said bell cranks being interconnected by a link whereby upon rotation of the bell crank on said rock shaft substantially rectilinear movement is imparted to said separator.

11. A device as set forth in claim 7 wherein the belts are arranged to move at a greater linear speed than the conveyor pushers.

12. An article feeding device which includes means for feeding and guiding articles through a substantially fixed, linear path of feed, and article separating means, said feeding means being the sole means for advancing articles to and beyond said separating means, which latter means include a stop in obstructive relation in the path of feed of said articles to register articles therealong, a separator spaced from said path of feed adjacent the trailing article so registered, means moving said separator to displace only the said trailing edge and bring the separator into the path of travel of said articles thus providing a barrier for successive articles, means for thereafter moving said stop out of its obstructive relation allowing the article to be advanced therebeyond by said feeding means, means for returning said stop into said obstructive relation and means for thereafter removing said separator from the path of travel of the articles.

13. An article feeding device which includes a conveyor having a run moving through a fixed plane and on which articles are placed, and article separating means, said conveyor comprising the sole means for feeding articles to and past said separating means, which means include a stop in obstructive relation with articles on said conveyor run to register such articles on said run, and a separator below said conveyor run and movable thereabove and spaced immediately beneath the trailing edge of an article so registered, means for raising said separator to lift only the said trailing edge and bring the separator into the path of travel of said articles thus providing a barrier for the successive article, means for thereafter moving said stop out of said obstructive relation allowing the article to be carried away by said conveyor, means for returning said stop into said obstructive relation and means for then lowering said separator below said conveyor run.

14. An article feeding device which includes a conveyor having a run moving through a fixed plane and on which articles are placed, and article separating means, said conveyor comprising the sole means for feeding articles to and past said separating means, which means include a stop in obstructive relation with articles on said conveyor run to register such articles on said run, and a separator below said conveyor run and movable thereabove and spaced immediately beneath the trailing edge of an article so registered, means for raising said separator to lift only the said trailing edge and bring the separator into the path of travel of said articles thus providing a barrier for the successive article, means for thereafter moving said stop out of said obstructive relation allowing the article to be carried away by said conveyor, means for returning said stop into said obstructive relation, means for then lowering said separator below said conveyor run and means preventing actuation of the means for moving the separator and stop unless an article has been registered by said stop.

References Cited in the file of this patent

UNITED STATES PATENTS

| | | |
|---|---|---|
| 2,576,367 | Sticelber | Nov. 27, 1951 |
| 2,679,919 | Koning | June 1, 1954 |
| 2,731,130 | Blickenderfer | Jan. 17, 1956 |

FOREIGN PATENTS

| | | |
|---|---|---|
| 434,818 | Germany | Oct. 2, 1926 |
| 602,736 | Germany | Sept. 15, 1934 |